United States Patent [19]
O'Dell et al.

[11] 3,747,305
[45] July 24, 1973

[54] TUBULAR GAS FILTER APPARATUS
[75] Inventors: Leonard J. O'Dell; William R. Hamilton, Jr., both of Louisville, Ky.
[73] Assignee: American Air Filter Company, Inc., Louisville, Ky.
[22] Filed: Apr. 16, 1971
[21] Appl. No.: 134,629

[52] U.S. Cl.................... 55/341, 55/378, 55/381
[51] Int. Cl.......................................... B01d 46/02
[58] Field of Search.................. 55/302, 303, 300, 55/304, 305, 361, 374, 378, 379, 380, 381; 210/322, 323; 285/162, 196, 200, 216, 222

[56] References Cited
UNITED STATES PATENTS
| | | | |
|---|---|---|---|
| 2,308,310 | 1/1943 | Ruemelin, Jr. et al. | 55/341 |
| 2,805,731 | 9/1957 | Kron | 55/300 |
| 3,177,636 | 4/1965 | Jenson | 55/341 |
| 3,243,206 | 3/1966 | Samen | 285/162 |
| 3,170,777 | 2/1965 | Held | 55/490 |

Primary Examiner—Bernard Nozick
Attorney—Ralph B. Brick and Charles G. Lamb

[57] ABSTRACT

An improved arrangement for releasably connecting an end of a tubular gas filter bag to an apertured plenum chamber plate member, including a flexible back-up band and a surrounding resilient collar member cooperatively mounted at the end of the bag to resiliently engage the surrounding wall of an aperture in the plate member to hold the bag end in fast position.

7 Claims, 3 Drawing Figures

PATENTED JUL 24 1973
3,747,305
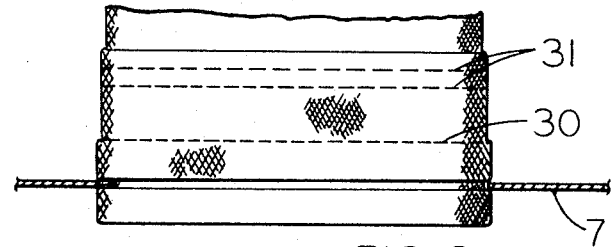
FIG. 2
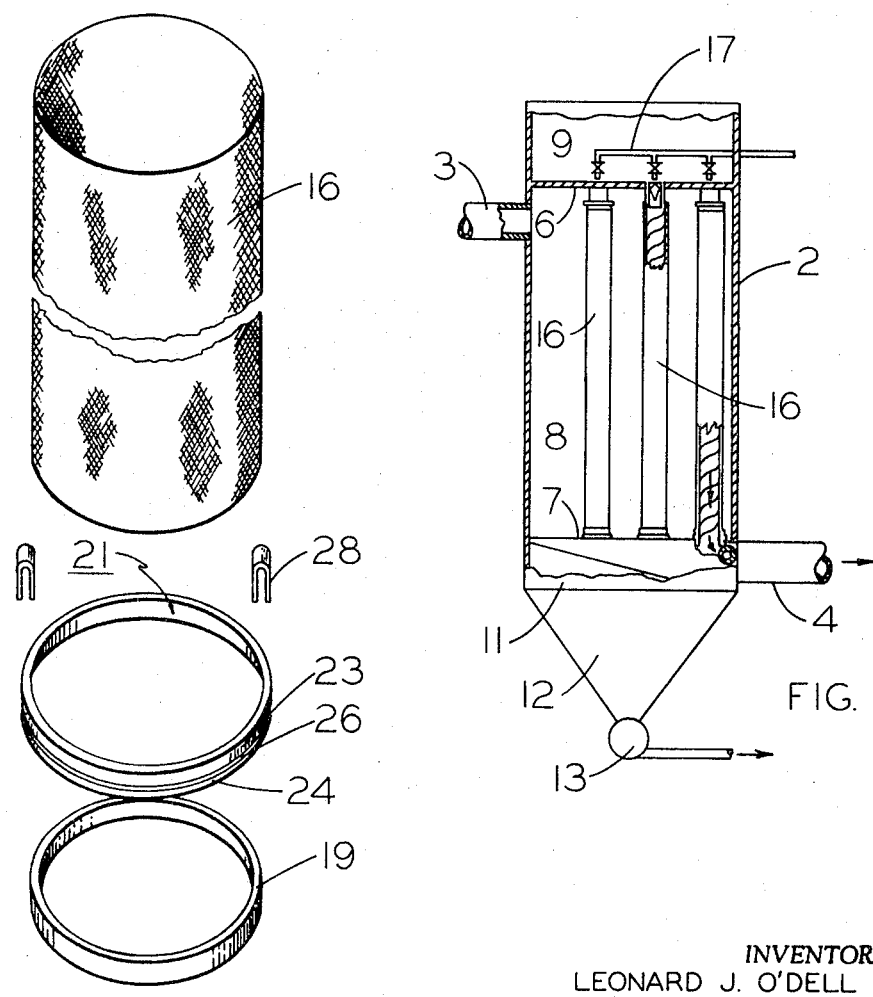
FIG. 3
FIG. 1
INVENTORS
LEONARD J. O'DELL
WILLIAM R. HAMILTON JR.
BY Ralph E. Brick

TUBULAR GAS FILTER APPARATUS

BACKGROUND OF THE INVENTION

The present invention relates to gas separation apparatus and more particularly to a releasable connecting arrangement for connecting the end of a filter bag to an apertured plate member.

Various arrangements are known in the art for connecting the ends of filter bags to the apertured plate members of plenums in gas separating apparatus. For the most part these past arrangements have been complex in design and construction, as well as expensive in manufacture and erection, quite often failing to effect a fast connection.

The present invention provides an economical, straight-forward arrangement which can be readily manufactured with a minimum of parts and a minimum of steps, and which, at the same time, permits rapid, releasable connection of a filter bag end to the surrounding walls of an aperture of a plate member of a plenum chamber to hold the bag end in fast position during gas treating operations.

Various other features of the present invention will become obvious to one skilled in the art upon reading the disclosure set forth hereinafter.

SUMMARY OF THE INVENTION

More particularly, the present invention provides, in a baghouse arrangement for filtering particulate matter from a gaseous stream including at least one tubular filter bag, an improved arrangement for connecting one end of the filter bag to an aperture of a plenum defining plate member comprising: a flexible band member, the band member having an outer diameter slightly less than the diameter of the aperture to which the bag end is connected; a soft, expansible compressible resilient collar surroundingly engaging the outer face of the band member, the resilient collar having a cross-sectional channel-like figuration to include spaced apart resilient ridges having a diameter in expanded stage slightly greater than the diameter of such aperture with a groove therebetween of a breadth substantially equal to the thickness of the plate member and of lesser outer diameter than the aperture, the resilient collar cooperating with the one end of the filter bag to hold the filter bag end in the aperture of the plate member with the groove disposed within the aperture of the plate member in faced relation thereto, and the ridges positioned on opposed sides of the plate member.

It is to be understood that various changes can be made in the arrangement, form and construction of the apparatus disclosed herein without departing from the scope or spirit of the present invention.

Referring to the drawing which discloses one advantageous embodiment of the the present invention:

FIG. 1 is an elevational view in section of an apparatus in accordance with the present invention;

FIG. 2 is an enlarged view of a portion of the filter bag of FIG. 1, disclosing one end of the bag in engagement with an apertured plate member, such end incorporating the novel construction of the present invention; and, FIG. 3 is a slightly reduced exploded view of the novel apparatus of FIG. 2 disclosing the several elements of the invention.

As shown in FIG. 1, a gas cleaning arrangement incorporating the present invention includes a housing 2 having a dirty gas inlet 3 and a clean gas outlet 4. Spaced apart transverse apertured plate members 6 and 7 divide housing 2 into a gas treating chamber 8, a reverse flow chamber 9 and an off-take chamber 11, the dirty gas inlet 3 communicating with the gas treating chamber 8 and the clean gas outlet 4 communicating with the off-take chamber 11. A suitable hopper 12 is positioned below off-take chamber 11, hopper 12 being provided with control valve 13 at the lower portion thereof. Gas treating chamber 8 is provided with a plurality of filter bags 16, which can be made of any one of several suitable gas impervious materials as is known in the art. Advantageously, a temperature resisting glass fiber material can be used.

Postioned in reverse flow chamber 9 is a valve controlled reverse flow flushing mechanism 17 which is utilized to induce jets of air in a reverse manner to clean the bags of particulate matter collected thereon. It is to be understood that the arrangement so far described constitutes one of several types of bag filter apparatus known in the art in which the apparatus of the present invention can be incorporated.

In accordance with the present invention, in order to attach the ends of the tubular filter bag apparatus 16 to the apertured plates 7 and 8, a novel releasable connecting arrangement is utilized.

Referring to FIG. 3 of the drawing, this releasable connecting arrangement is shown to include a flexible band back-up member 19. Back-up band 19 can be made from any one of several suitable flexible, spring-like metallic or plastic materials. Band 19 is sized to have an outer diameter slightly less than the diameter of the aperture in which it is to be disposed in apertured plate member 7. Band member 19 serves as a back-up member for a soft, expansible-compressible resilient collar 21 which surroundingly engages the outer face of band member 19. Collar 21 advantageously can be formed from a fabric folded upon itself or can be extruded from a silicone material to provide a cross-sectional channel-like configuration including spaced apart resilient ridges 23 and 24 having a diameter in expanded stage slightly greater than the diameter of the aperture to which the end of the filter bag 16 is fastened. A groove 26 is disposed between the ridges, this groove having a breadth substantially equal to the thickness of plate member 7 and having a lesser outer diameter than the aperture.

Resilient material 21 can be fastened to backing ring 19 by suitable adhesive coated tape members 28. It is to be noted that inner ring 19 is sized in the instant embodiment to slip over bag 16 at the end therof. The bag end is then folded back upon itself and stitched as at 30 and 31 to position the back-up ring 19 and resilient collar 21 therebetween.

In assembly of the filter bag end 16 to apertured plate member 7, it is only necessary to install the end of the bag member in the aperture with the flexible band 19 and the resilient collar 21 giving sufficiently to permit insertion of the filter bag end. The groove 26 between the ridges 23 and 24 engages in collar like fashion gainst the wall of the aperture and the ridges rest on opposite sides of plate member 7. Thus, the filter bag end can be readily and easily replaceably connected to apertured plate member 7 in a minimum of steps and with a minimum of effort.

We claim:

1. In a bag house arrangement for filtering particulate matter from a gaseous stream including at least one plenum having an apertured plate member for gas passage therethrough and at least one tubular filter bag with one of its ends connected to said plate in flow-through communication with said plenum, the improvement comprising: in combination a flexible resilient band member having an outer diameter slightly less than the diameter of said aperture to which said filter bag end is connected; a soft, expansible-compressible resilient collar surroundingly engaging the outer face of said band member, said bag end being positioned in surrounding relationship with said collar, said resilient collar being being further defined as having a cross-sectional channel-like configuration to include spaced apart, resilient ridges having a diameter in expanded stage slightly greater than the diameter of said aperture with a groove therebetween of a breadth substantially equal to to the thickness of said plate member and of lesser outer diameter than said aperture, said bag end and said resilient collar being biased against the aperture of the plate to hold said filter bag end in flow communication with said aperture with the groove disposed within the aperture of said plate member to face the wall thereof and the ridges positioned on opposed sides thereof.

2. The apparatus of claim 1, said band being of flexible metallic spring steel and said resilient material being a cloth-like fabric folded upon itself to define said cross-sectional channel configuration.

3. The apparatus of claim 1, and, tape members to hold said resilient material to said band.

4. The apparatus of claim 1, said resilient collar comprising felted cloth-like material folded upon itself to provide the cross-sectional channel-like configuration.

5. The apparatus of claim 1, said resilient collar comprising a silicone extruded in cross-sectional channel-like configuration.

6. The apparatus of claim 1, said end of said filter bag being folded back upon itself to define an annular space containing said band and resilient material.

7. The apparatus of claim 6, wherein said folded back end of said filter bag is stitched to the bag sidewall to further define said annular space containing said band and resilient material.

* * * * *